United States Patent [19]
Nicoloff, Jr. et al.

[11] Patent Number: 5,975,679
[45] Date of Patent: Nov. 2, 1999

[54] DOT ALIGNMENT IN MIXED RESOLUTION PRINTER

[75] Inventors: Nicholas Nicoloff, Jr., La Mesa, Calif.; Mark S. Hickman, Vancouver, Wash.; John A. Christianson, Vancouver, Wash.; Douglas L. Franz, Vancouver, Wash.; Donald G. Harris, Escondido, Calif.; Majid Azmoon, Poway, Calif.

[73] Assignee: Hewlett-Packard Company, Palo Alto, Calif.

[21] Appl. No.: 08/901,124

[22] Filed: Jul. 28, 1997

Related U.S. Application Data

[63] Continuation of application No. 08/399,402, Mar. 6, 1995, abandoned, which is a continuation-in-part of application No. 08/145,261, Oct. 29, 1993.

[51] Int. Cl.⁶ ........................................................ B41J 2/21
[52] U.S. Cl. ................................. 347/43; 347/40; 347/37
[58] Field of Search .................................. 347/43, 37, 50, 347/40, 15; 358/298

[56] References Cited

U.S. PATENT DOCUMENTS

| | | | |
|---|---|---|---|
| 4,511,907 | 4/1985 | Fukuci | 347/43 X |
| 4,812,859 | 3/1989 | Chan et al. | 346/140 R |
| 4,833,491 | 5/1989 | Rezanka | 346/140 R |
| 4,965,593 | 10/1990 | Hickman | 346/140 R |
| 4,967,203 | 10/1990 | Doan et al. | 346/1.1 |
| 4,999,646 | 3/1991 | Trask | 346/11 |
| 5,057,852 | 10/1991 | Formica et al. | 347/43 |
| 5,146,236 | 9/1992 | Hirata et al. | 347/15 X |
| 5,208,605 | 5/1993 | Drake | 347/15 |
| 5,278,584 | 1/1994 | Keefe et al. | 346/140 R |
| 5,325,115 | 6/1994 | Tanahashi | 347/217 X |
| 5,327,166 | 7/1994 | Shimada | 347/15 X |
| 5,357,344 | 10/1994 | Kasamatsu et al. | 358/298 |
| 5,376,958 | 12/1994 | Richtsmeier et al. | 347/40 |
| 5,404,020 | 4/1995 | Cobbs | 347/37 |
| 5,455,610 | 10/1995 | Harrington | 347/43 |
| 5,463,471 | 10/1995 | Chou | 358/298 |
| 5,608,434 | 3/1997 | Wilson et al. | 347/50 |

FOREIGN PATENT DOCUMENTS

| | | | |
|---|---|---|---|
| 0378387A2 | 7/1990 | European Pat. Off. | B41J 2/01 |
| 0517543A2 | 12/1992 | European Pat. Off. | B41J 2/205 |
| 0595651A2 | 5/1994 | European Pat. Off. | B41J 2/21 |
| 1216852 | 8/1989 | Japan | 347/40 |
| WO91/08902 | 6/1991 | WIPO | B41J 2/15 |

OTHER PUBLICATIONS

Althauser et al., IBM Technical Disclosure Bulletin, vol. 23, No. 7a, Dec. 1980, pp. 2700–2701, XP000570859.

Sekiya Takuro, Patent Abstracts of Japan, vol. 18, No. 25 (M–1542), Jan. 14, 1994 & JP–A–05 261941 (Ricoh Co Ltd) abstract.

*Primary Examiner*—N. Le
*Assistant Examiner*—Hai C. Pham

[57] ABSTRACT

In the preferred form, a scanning carriage in a color inkjet printer houses a high resolution printhead for black (or monochrome) printing and one or more lower resolution printheads for color printing. The nozzle arrangements, paper feed increments, and ink drop firing frequency for the black printhead and color printhead(s) are selected to provide various alignments between the larger color ink dots and the smaller black ink dots to achieve maximum ink coverage with a minimum of ink or to achieve additional color shades.

9 Claims, 15 Drawing Sheets

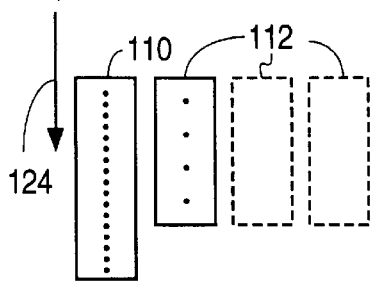 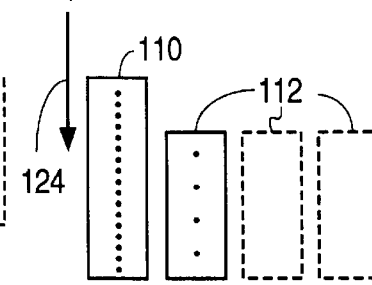 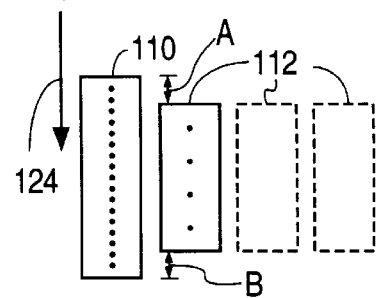
FIG. 13A　　FIG. 13B　　FIG. 13C
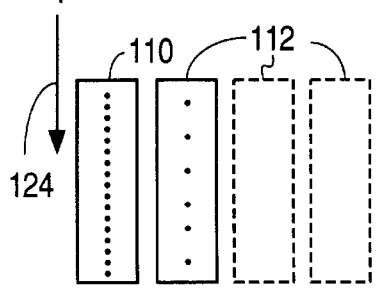 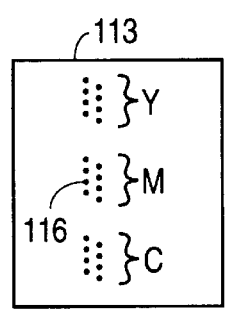 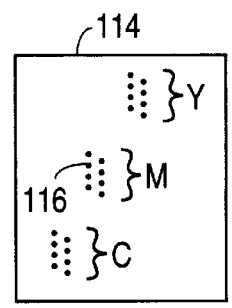
FIG. 13D　　FIG. 14　　FIG. 15
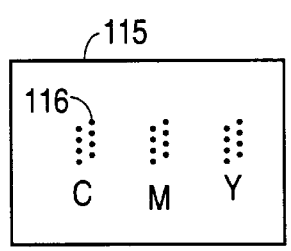 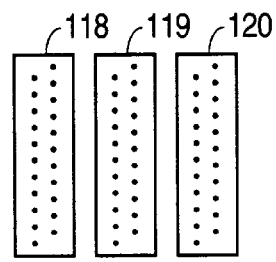
FIG. 16　　FIG. 17

DOT ALIGNMENT IN MIXED RESOLUTION PRINTER

CROSS-REFERENCE TO RELATED APPLICATIONS

This is a continuation of application Ser. No. 08/399,402 filed Mar. 6, 1995, now abandoned, which is a continuation-in-part of application Ser. No. 08/145,261, filed Oct. 29, 1993, entitled MIXED RESOLUTION PRINTING FOR COLOR AND MONOCHROME PRINTERS, by Donald G. Harris, et al.

This application also relates to the copending applications Ser. No. 08/056,556, filed Apr. 30, 1993, now U.S. Pat. No. 5,408,746, entitled DATUM FORMATION FOR IMPROVED ALIGNMENT OF MULTIPLE NOZZLE MEMBERS IN A PRINTER, by Jeffrey A. Thoman, et al., and Ser. No. 07/958,833, filed Oct. 8, 1992, entitled PRINTHEAD WITH REDUCED INTERCONNECTIONS TO A PRINTER, by Michael B. Saunders, et al., both owned by the assignee of this application and incorporated herein by reference.

BACKGROUND OF THE INVENTION

This invention relates generally to printers, and more specifically to printing devices and techniques for monochrome and color printers capable of achieving high quality resolution.

High quality printers are typically characterized by numbers indicating their resolution in dots per inch (dpi). This resolution is usually described in the context of a two dimension coordinate system where one number indicates the resolution in the x-axis (as used herein, x-axis means the carriage scan axis for a swath printer), and another number indicates the resolution in the y-axis (as used herein, y-axis means the media advance axis for a swath printer). Thus, a resolution of 300/300 dpi generally indicates a carriage-scan axis resolution of 300 dots per inch and a media-advance axis resolution of 300 dots per inch. If only a single dpi number is given, it is assumed the dpi in both axes are equal.

The resolution of a printhead is primarily determined by the actual printout dot size as it appears in a printout.

Hewlett-Packard has developed a 600 dpi inkjet pen for producing a very high resolution printout. One embodiment of this pen is described in Hewlett-Packard's U.S. Pat. No. 5,278,584, by Brian J. Keefe, et al., entitled INK DELIVERY SYSTEM FOR AN INKJET PRINTHEAD, incorporated herein by reference. The nozzle array of this 600 dpi pen contains 300 nozzles and prints a swath approximately one-half inch wide along the x-axis. Some of Hewlett-Packard's color printers will include a scanning carriage housing the 600 dpi pen, containing black ink, as well as one or more color inkjet pens. Currently these color inkjet pens have a resolution of 300 dpi and a width on the order of one-third inch.

The particular alignment of the 600 dpi and 300 dpi resolution printheads in the carriage as well as the particular alignment of the printed high resolution dots and lower resolution dots can be selected to achieve certain characteristics and advantages.

BRIEF SUMMARY OF THE INVENTION

In the preferred form, a scanning carriage in a color inkjet printer houses a high resolution printhead for black (or monochrome) printing and one or more lower resolution printheads for color printing.

The nozzle arrangements, paper feed increments, and ink drop firing frequency for the black printhead and color printhead(s) are selected to provide various alignments between the larger color ink dots and the smaller black ink dots to achieve maximum ink coverage with a minimum of ink or to achieve additional color shades. In one embodiment, the centroid of a group of four smaller dots is aligned with the centroid of a larger dot along the scanning direction (i.e., x direction). In another embodiment, the midpoint between two vertically aligned smaller dots is aligned with the centroid of a larger dot along the scanning direction. Each smaller dot in a cluster of four smaller dots may be positioned around the centroid of the cluster at 90° angles with respect to the x and y axes or at 45° angles with respect to the x and y axes.

BRIEF DESCRIPTION OF THE DRAWINGS

FIGS. 13A–13D are schematic views as seen looking up from the media showing four different alignments between a high resolution nozzle array and one or more lower resolution nozzle array(s);

FIGS. 14, 15 and 16 are schematic views of single-plate nozzle arrays for three different tricolor inkjet pens;

FIG. 17 is a schematic view of the nozzle arrays of three separate color pens as positioned within the carriage of FIG. 2;

DETAILED DESCRIPTION OF THE PREFERRED EMBODIMENT

In a multiple pen printer, it is important to improve the output quality of a printed page and increase the speed at which that output can be obtained as economically and simply as possible. In a printer mechanism, the output quality of a printed page is a function of printhead resolution. The higher the resolution the better the print quality. Also, in a swath printer employing a scanning carriage, the speed at which the output can be obtained is a function of the width of the swath which is covered by the printhead.

In current multi-pen printers, each pen has the same resolution and usually the same swath width. This means that all the supporting structure, mechanics and electronics needs to be scaled up to support the resolution of the entire set of pens. All this hardware is more expensive than the hardware to support a multi-resolution, multi-swath width pen set where one pen is at the desired higher resolution and larger width, and the other pens in the set are at a lower resolution and smaller size.

One embodiment of the invention incorporates a high resolution inkjet pen and one or more lower resolution inkjet pen(s) in the same scanning carriage in a printer. The higher performance pen can be used to improve output quality by enhancing certain key features that appear frequently in a printed page such as text. Such a pen also improves throughput by being able to print these frequent features faster. The other lower performance pens can be used for less frequent or less demanding features such as graphics and color printing.

In the presently preferred embodiment of the invention disclosed herein, we have combined a 600 dpi ½ inch swath black pen with three 300 dpi color pens each generating a swath of approximately ⅓ inch. The high performance black pen is typically used for printing text and other "black only" features, and thus the output quality and throughput of these features is greater. It also improves the output quality of color graphics and color features by teaming with the three lower performance color pens when printing color graphics or color features. The black component of the graphics, which is often a large portion of color graphics content, is at a higher resolution and thus at a higher output quality level. The larger swath can then be combined with printing algorithms to improve the throughput of color graphics.

Figure 1:
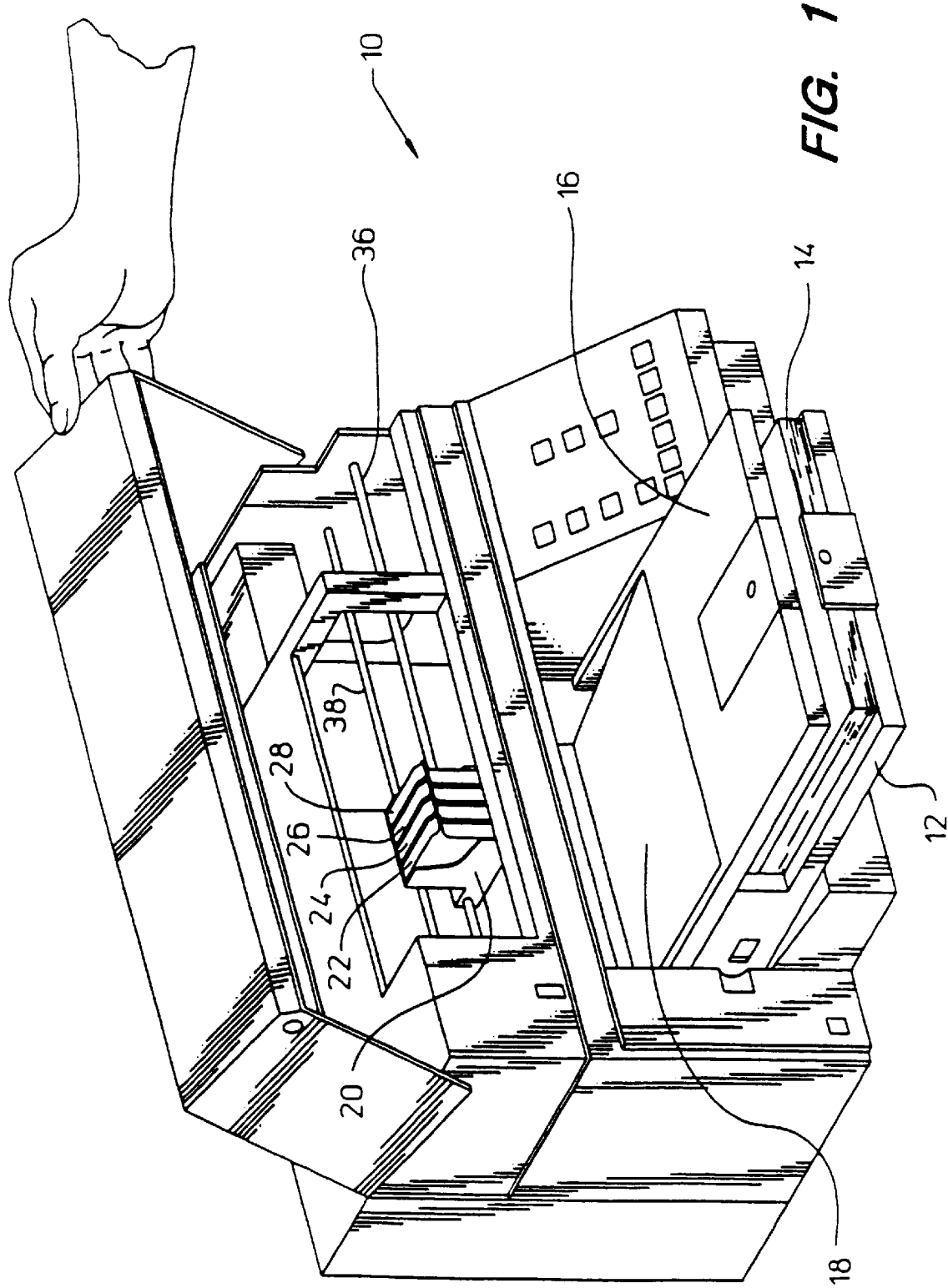
FIG. 1 shows a typical inkjet printer which can incorporate the apparatus and method of the present invention.
Figure 2:
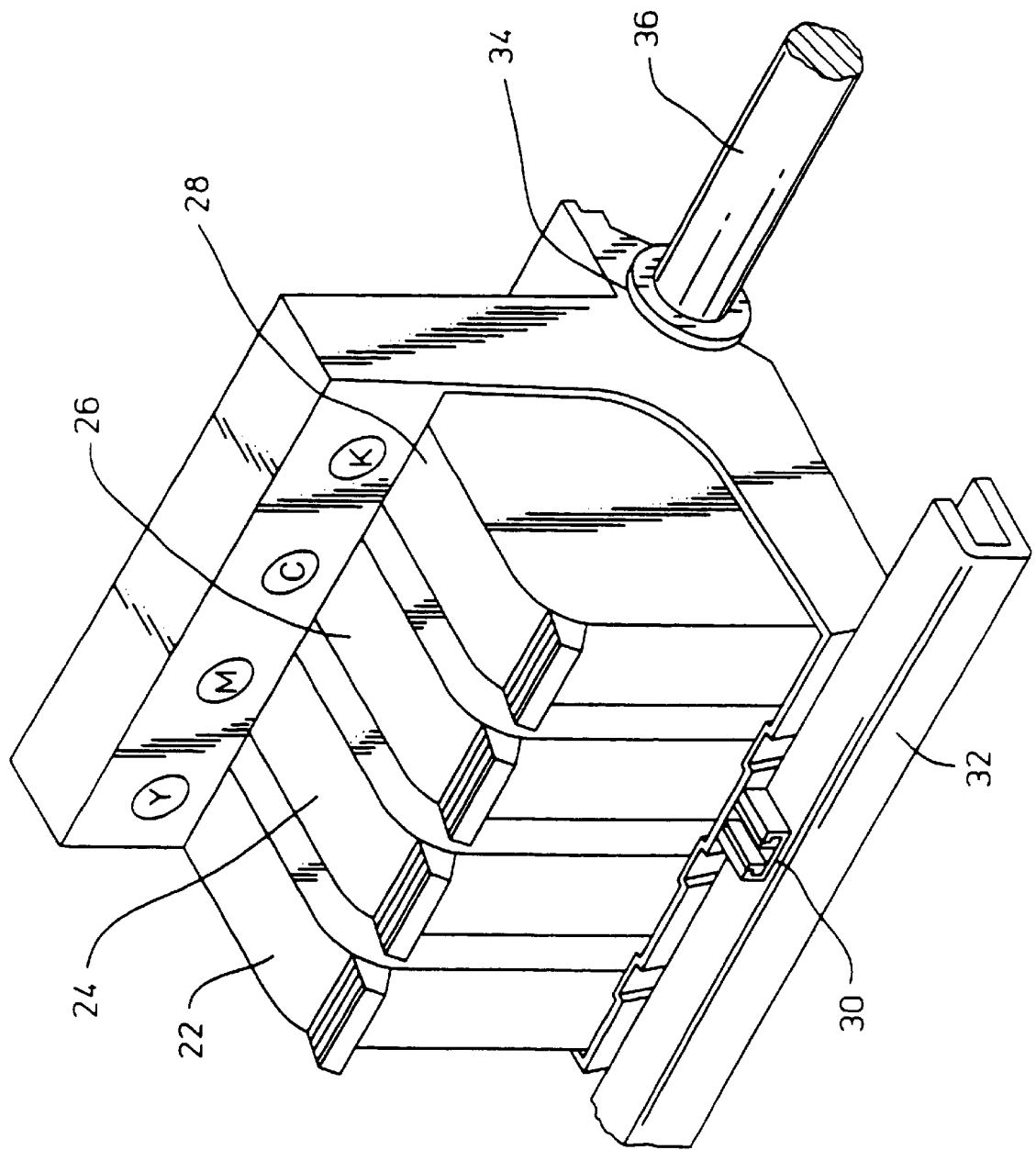
FIG. 2 shows a carriage having removable multi-color print cartridges, which can incorporate the apparatus and method of the present invention.
Figure 3:
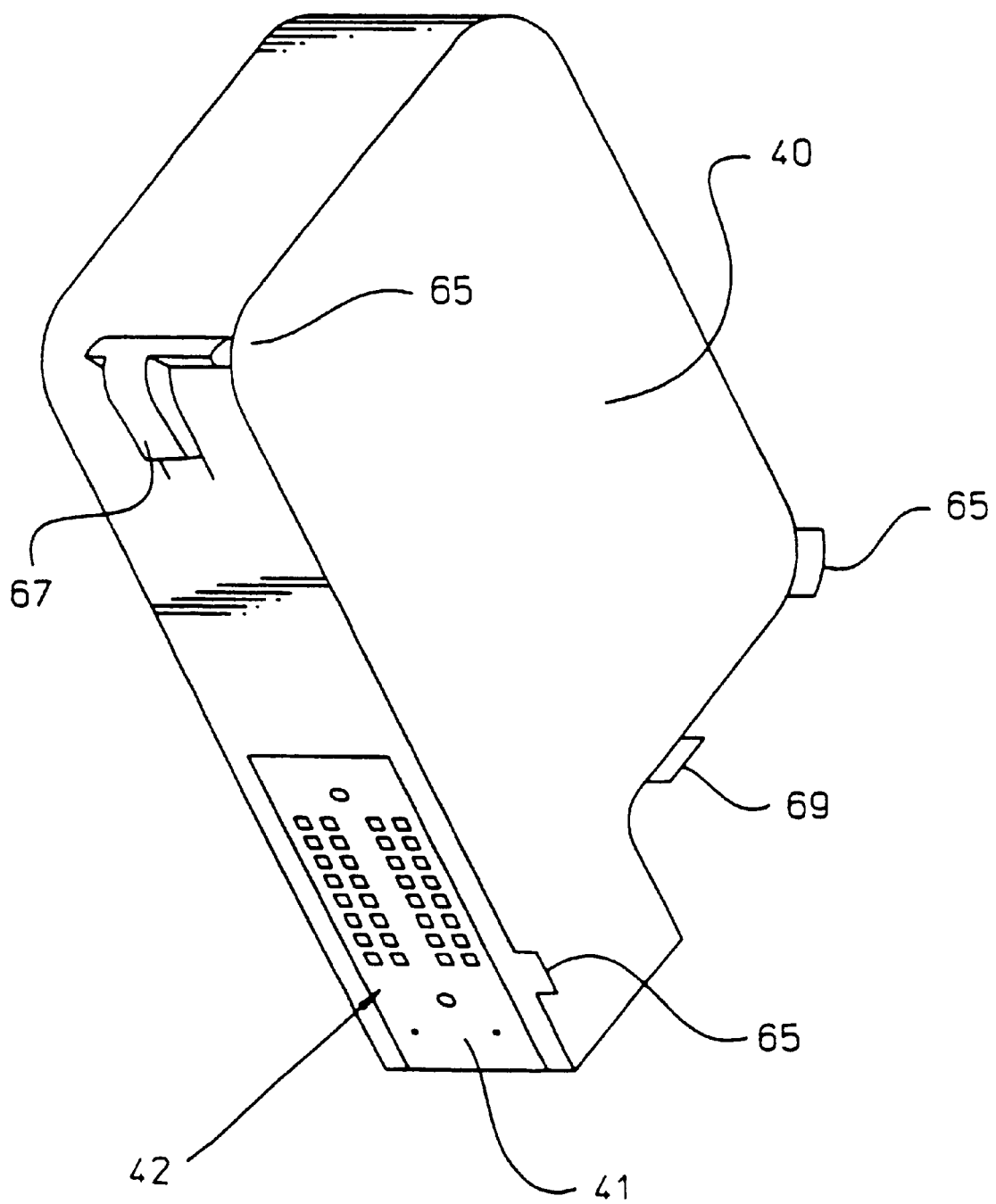
FIG. 3 shows an exemplary lower resolution color inkjet print cartridge used in one embodiment of the invention.

Even though the invention can be used in any printing environment where text and/or graphics are applied to media using monochrome and/or color components, the presently preferred embodiment of the invention is used in an inkjet printer of the type shown in FIG. 1. In particular, inkjet printer 10 includes an input tray 12 containing sheets of media 14 which pass through a print zone, and are fed past an exit 18 into an output tray 16. Referring to FIGS. 1–2, a movable carriage 20 holds print cartridges 22, 24, 26, and 28 which respectively hold yellow (Y), magenta (M), cyan (C) and black (K) inks. The front of the carriage has a support bumper 30 which rides along a guide 32 while the back of the carriage has multiple bushings such as 34 which ride along slide rod 36. The position of the carriage as it traverses back and forth across the media is determined from an encoder strip 38 in order to be sure that the various ink nozzles on each print cartridge are selectively fired at the appropriate time during a carriage scan.

In another embodiment printer, the color print cartridges 22, 24, and 26 are replaced by a single tricolor cartridge having a nozzle plate such as shown in FIGS. 14, 15, or 16.

Figure 4:
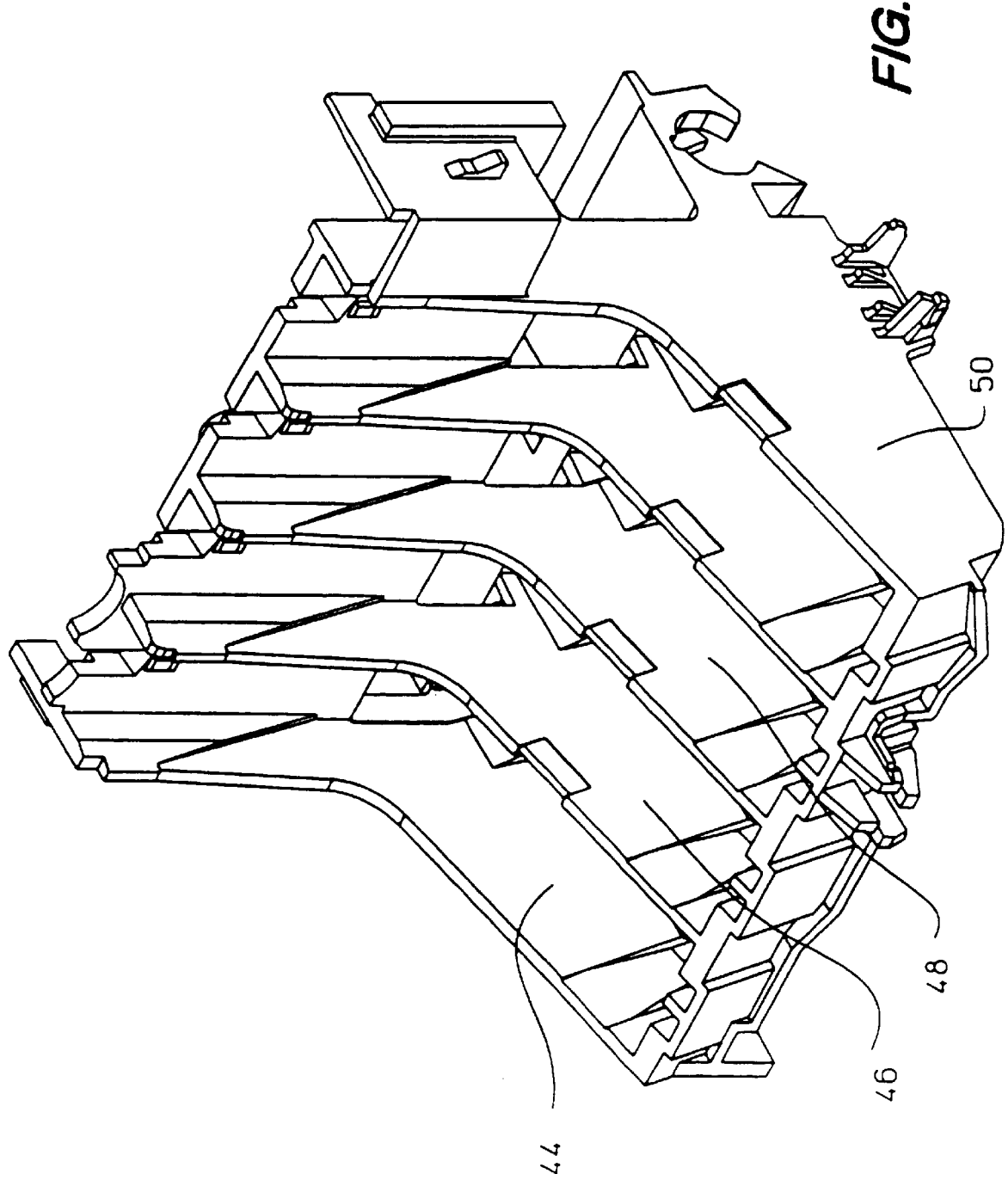
FIG. 4 is a perspective view of a carriage incorporating one embodiment of the invention in an inkjet printer.
Figure 5:
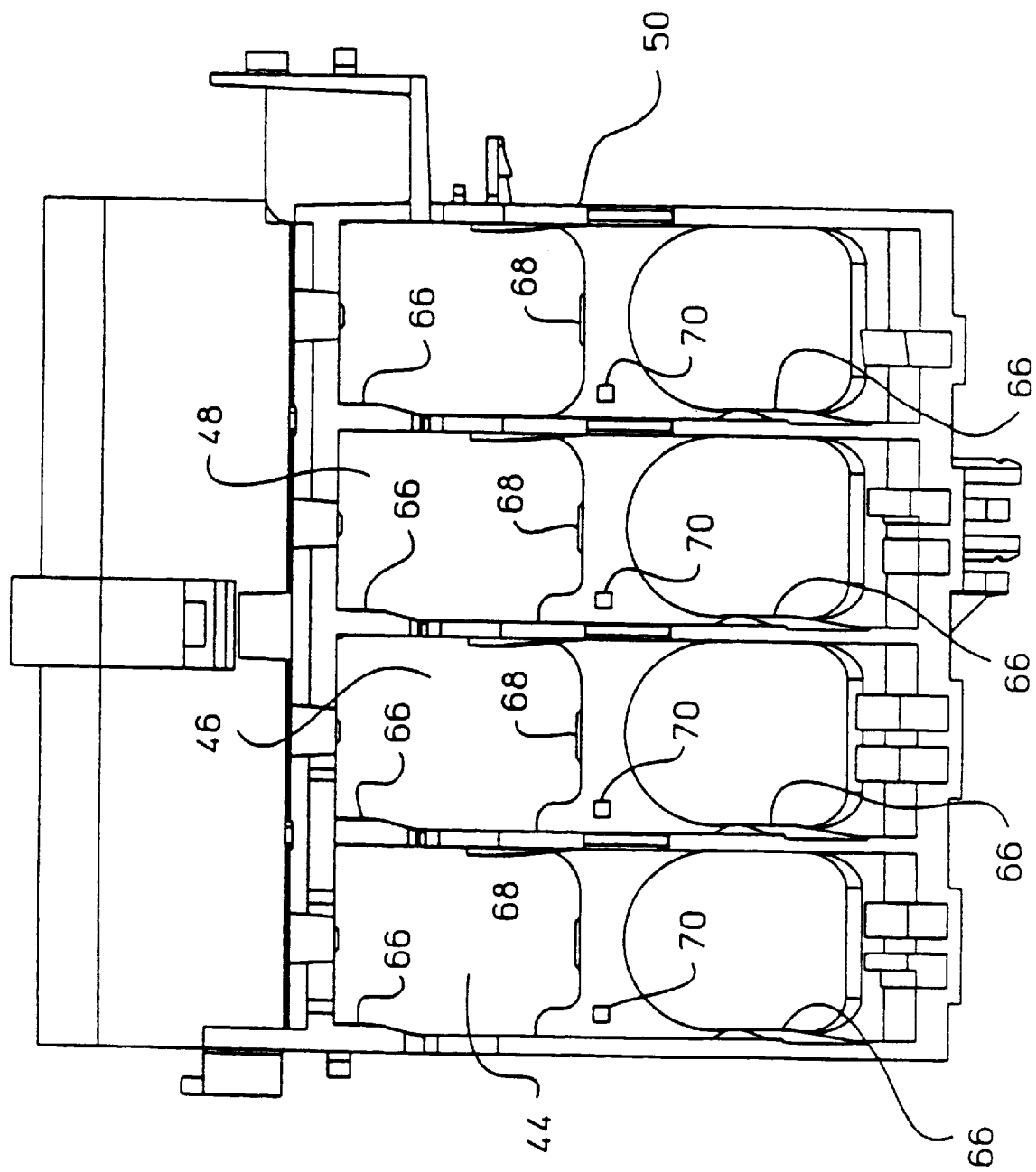
FIG. 5 is a top view of the carriage of FIG. 4.
Figure 6:
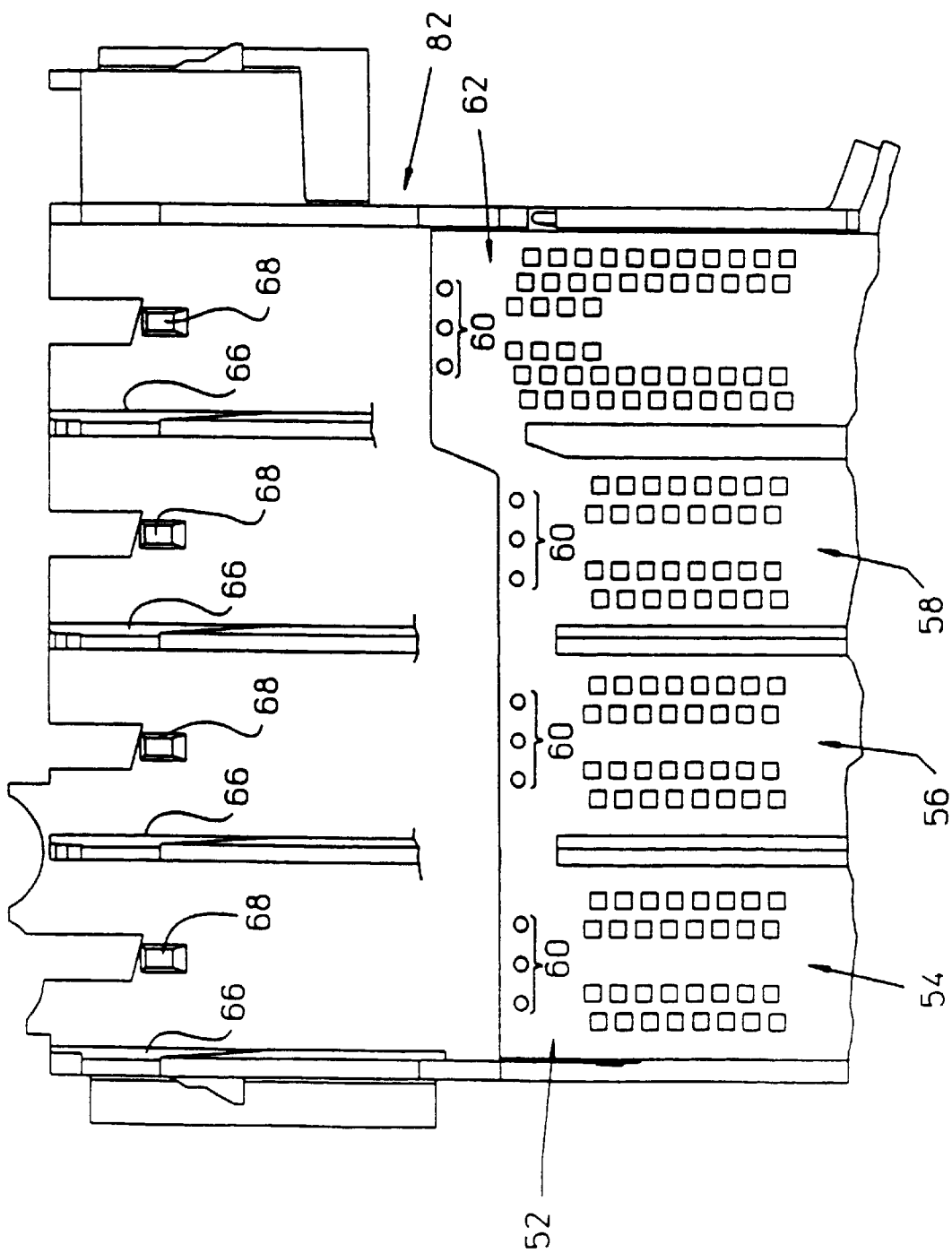
FIG. 6 is a fragmentary view of the flex-circuit interconnect on the carriage of FIGS. 4 and 5, with the interior carriage walls cut away.

Referring to FIGS. 3–6, a 300 dpi color inkjet cartridge 40 having a tab-circuit 41 with a four column thirty-two pad electrical interconnect 42 is removably installed in three chutes 44, 46, 48 of a unitary carriage 50 (FIG. 4). A flex-circuit member 52 (FIG. 6) having three matching sets of conductive pads 54, 56, 58 is mounted on flex-frame pins 60 for operative engagement with the cartridge pads when the cartridge is inserted into its appropriate chute. An enlarged set of conductive pads 62 covering a larger area, having a different layout, and constituting an array of six columns totaling fifty-two conductive pads on the flex-circuit member is designed for operative engagement with cartridge pads on a 600 dpi black inkjet cartridge 64 (see FIG. 9).

The preferred structure and techniques for preventing mistaken installation of a 600 dpi black printhead in a color printhead chute, or alternatively the mistaken installation of a 300 dpi color printhead in a black printhead chute is described in the copending applications identified above and incorporated by reference herein.

Because of the differently configured electrical interconnect on the 600 dpi cartridge, and in order to avoid substantially changing the existing X/Y/Z datum configuration of the carriage, a unique interconnect scheme is employed. In that regard, the X-axis cartridge datums 65 engage the X-axis carriage datums 66, and the Y-axis cartridge datums 67 engage the Y-axis carriage datums 68, and the Z-axis cartridge datums 69 engage the Z-axis carriage datums 70 in a manner more fully described in the copending applications identified above and incorporated by reference herein.

Figure 9:
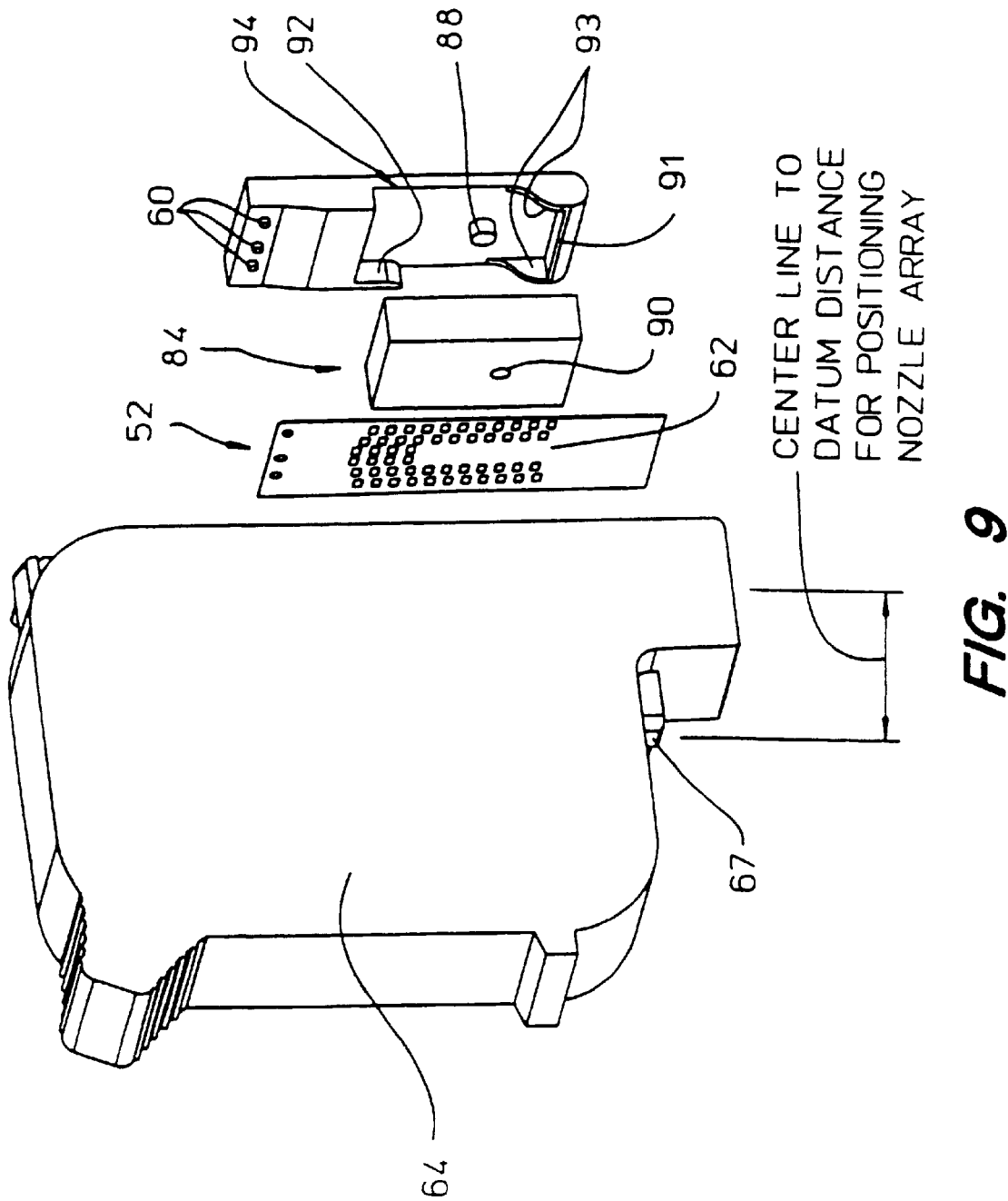
FIG. 9 is a schematic view showing the use of a foam member for operatively connecting a flex-circuit to a higher resolution black inkjet cartridge.
Figure 10:
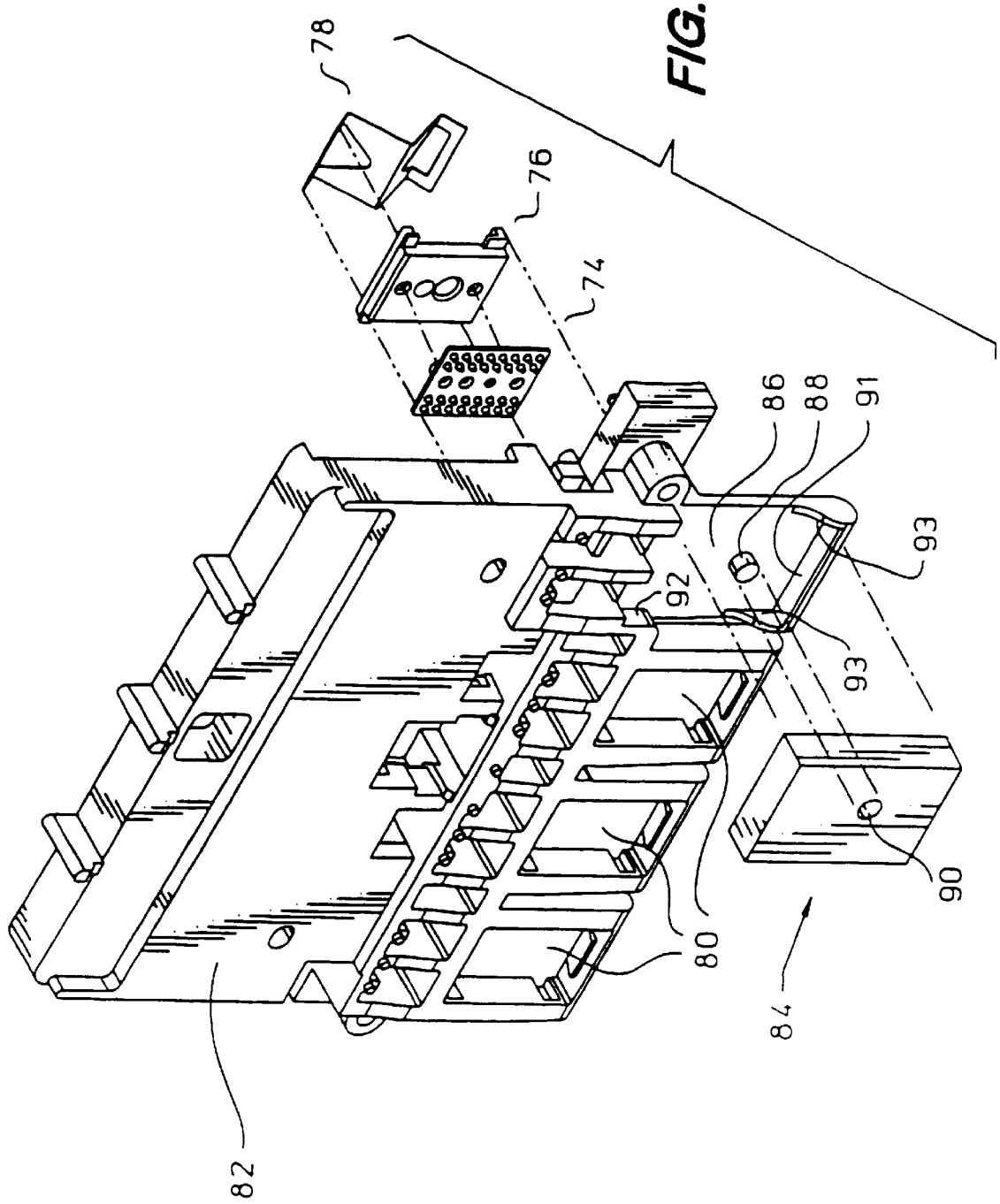
FIG. 10 is an exploded view showing a flex-circuit frame portion of a carriage, with the foam spring member of FIG. 9 for assuring pressure connection of a flex-circuit to a higher resolution black inkjet cartridge, and a metal spring member for assuring pressure connection of a flex-circuit to lower resolution color inkjet cartridges.
Figure 11:
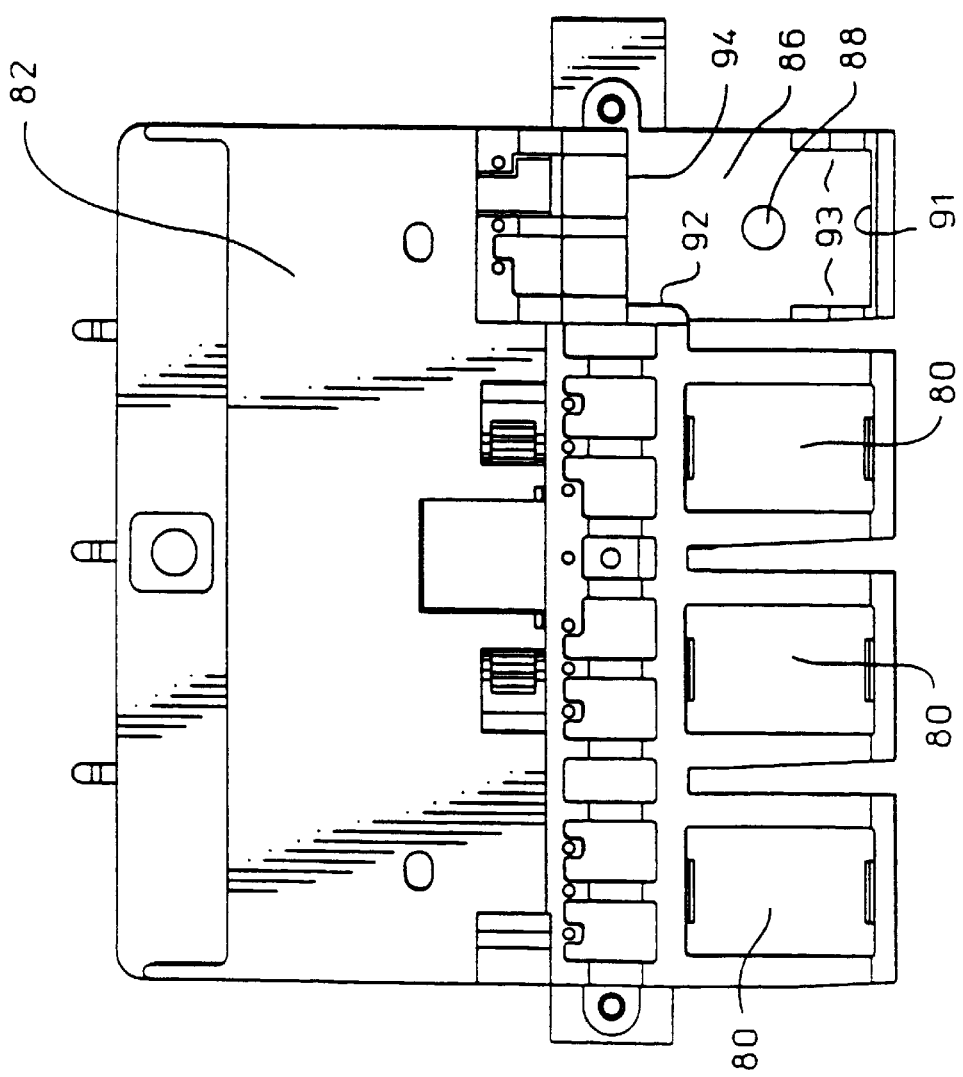
FIG. 11 is a front view of the flex-circuit frame of FIG. 10.

As best shown in FIGS. 9–11, a spring assembly including a backing sheet 74, a plate 76 and a gimbal spring 78 are sized for fitting into apertures 80 of flex-circuit frame 82 to assure proper electrical interconnection for the three color cartridges.

A unique spring assembly for the 600 dpi cartridge interconnect includes a unitary resilient foam member 84 which fits in a seat 86 which is larger than the aperture 80. A mounting peg 88 fits into matching hole 90 which along with bottom and lower ledges 91, 93 and upper side and top ledges 92, 94 hold the foam member in proper position to assure operative engagement across the electrical interconnect.

Figure 7:
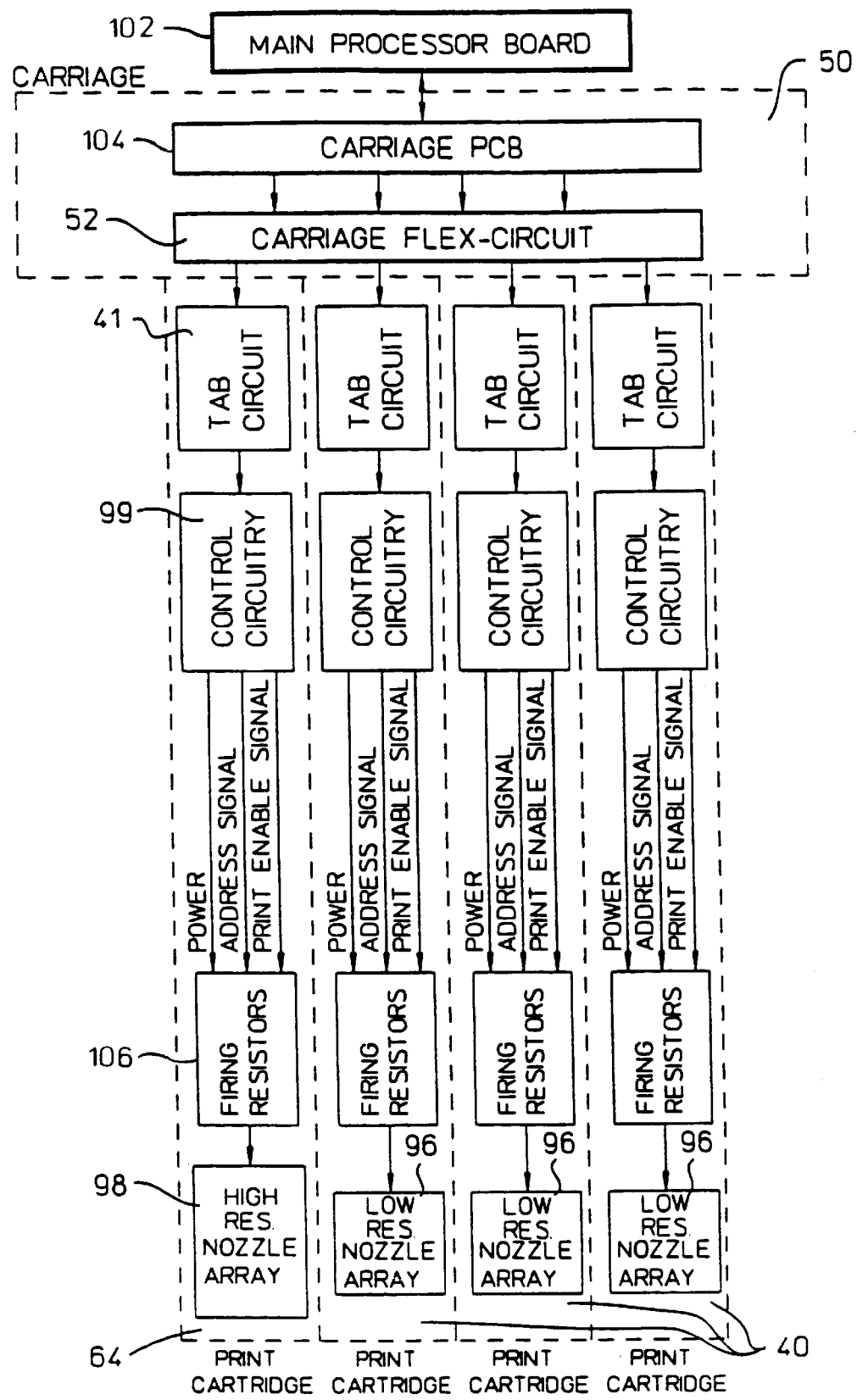
FIG. 7 is a schematic block diagram of the print cartridges in one embodiment of the invention.
Figure 8:
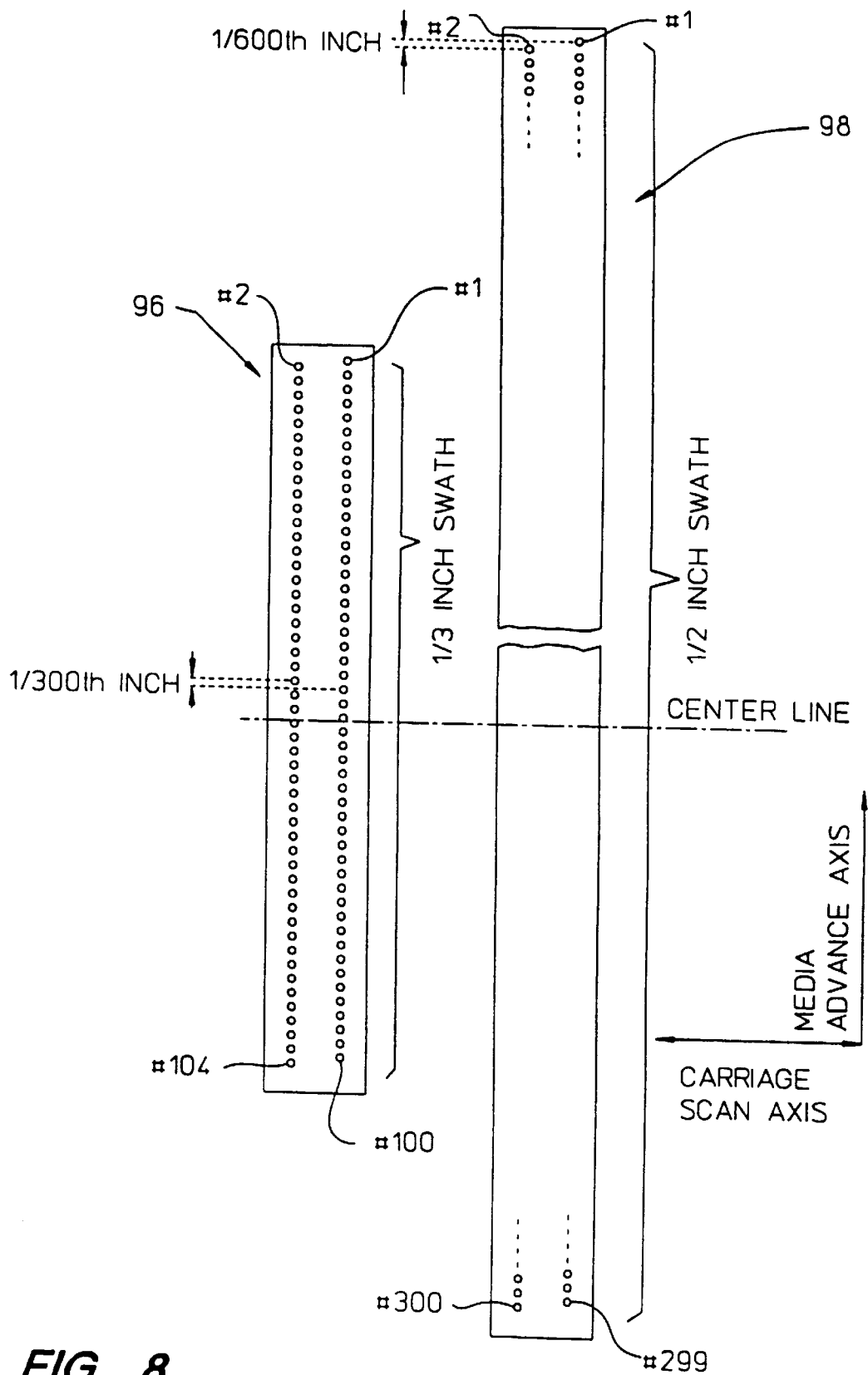
FIG. 8 is a schematic bottom view as seen looking up from the media showing one alignment relationship of the nozzle arrays of FIG. 7.

FIGS. 7–8 show one possible mounting relationship between a 300 dpi nozzle array 96 of the color printheads and a 600 dpi nozzle array 98 of the black printhead. Control circuitry 99 (including a multiplexer) on the substrate enables the three hundred firing resistors of the black printhead to be controlled through fifty-two electrical interconnect pads, and similarly enables all one hundred four firing resistors of each color printhead to be controlled through thirty-two electrical interconnect pads. A main processor board 102 provides electrical signals to the carriage printed circuit board 104 for selectively energizing the firing resistors 106.

Figure 12:
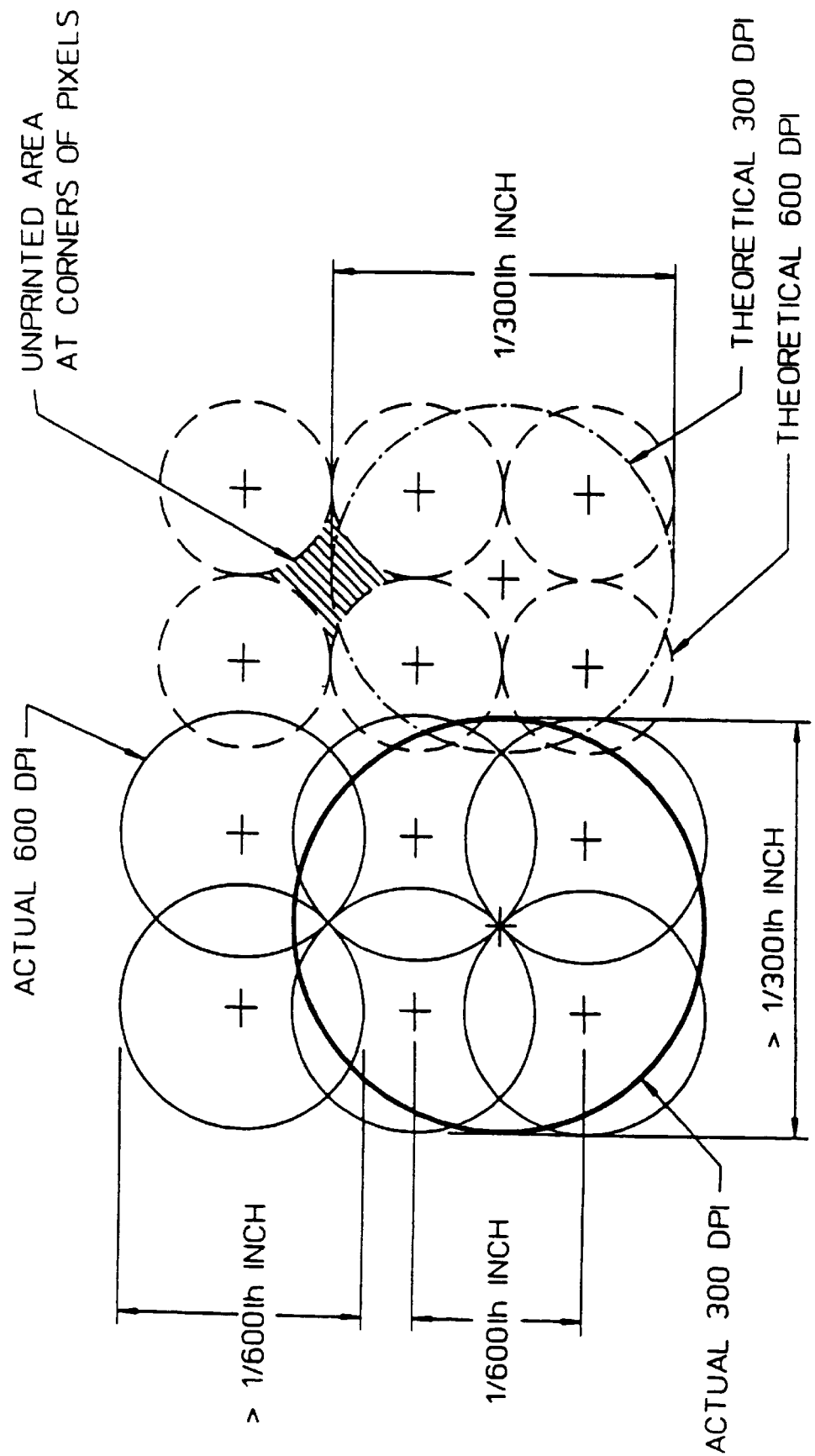
FIG. 12 is a schematic diagram showing the relative resolution between a 600 dpi printout of the black printhead and a 300 dpi printout of the color printheads in one embodiment of the invention.

FIG. 12 schematically shows the difference between the 300 dpi printout produced by the color pens (i.e., pen cartridges) and the 600 dpi printout of the black pen of the preferred embodiment described herein. The type of paper used, along with other well known factors, affect ink bleed. Therefore, the diameters of the actual printed dots in FIG. 12 will vary.

Of course, it would be possible to incorporate different combinations of resolution in different printheads wherein the resolution difference may be arbitrary, depending on the printheads available and already developed, or wherein the resolution difference may be decimally related (e.g., 20% greater resolution, 30% greater resolution, etc.) or fractionally related (300 dpi with 400 dpi; 300 dpi with 450 dpi, etc.). In that regard, the invention can be implemented with any of the existing inkjet cartridges which are currently available, with the best results occurring with printheads in the range of 180 dpi or greater.

Although FIGS. 8 and 12 show a preferred embodiment of the alignment between a high resolution nozzle array and a lower resolution nozzle array and a preferred embodiment of the alignment between the high resolution printed dots and the lower resolution printed dots, other alignments are possible and have particular advantages.

FIGS. 13A, 13B, and 13C illustrate three different alignments between a one-half inch, 600 dpi black inkjet pen 110 and one or more color inkjet pens 112 when these pens 110, 112 are housed in a single carriage. Only the nozzle array faces are illustrated for simplicity.

If a tricolor (CMY) pen is used, then only one inkjet pen 112 need be used with the black inkjet pen 110. In the embodiments of FIGS. 13A–13D, two additional color pens 112, employed when tricolor pens are not used, are shown in dashed outline.

FIGS. 14, 15, and 16embodiments of a rent embodiments of a printhead nozzle array face 113, 114, and 115, respectively, for such a tricolor inkjet pen having three separate ink compartments for the cyan, magenta, and yellow ink. Identified in FIGS. 14–16 are the three sets of nozzles in the nozzle array face for the cyan (C), magenta (M), and yellow (Y) ink. The nozzles for each of the colors may be vertically aligned as in FIG. 14, staggered as in FIG. 15, or horizontally aligned as in FIG. 16. Two rows of offset nozzles 116 are provided for each color to provide a high vertical density of dots. A printer incorporating a tricolor cartridge may resemble that of FIG. 1 except that cartridges 22, 24, and 26 would be a single tricolor cartridge alongside the black inkjet cartridge 28.

FIG. 17 illustrates the nozzle arrays of three separate color pens 118, 119 and 120 when installed in the carriage 50 of FIG. 4. Pen 118 may be a cyan pen, pen 119 may be a magenta pen, and pen 120 may be a yellow pen, as also illustrated in FIG. 2, but the order of pens is not very significant to this invention.

In FIG. 13A, the tops of the printheads of the color pens 112 are positioned near or aligned with the top of the printhead of the black pen 112 so as to be farther from the paper outlet or output rollers. The direction of paper transport is shown by arrow 124. This alignment allows the color ink to be placed on the paper farther from the output rollers so that the color ink is given more time to dry before the paper is ejected by the output rollers. One contrasting example of the positioning of printheads relative to the output roller of a color printer is shown in U.S. Pat. No. 5,376,958, entitled STAGGERED PENS IN COLOR THERMAL INK-JET PRINTER, by Brent W. Richtsmeier, et al., assigned to the present assignee and incorporated herein by reference. The concepts described herein may be used in conjunction with that printer or any other printer. The relative alignments shown in FIG. 13A provide the above-mentioned benefit irrespective of the actual distance from the nozzle arrays to the output rollers.

FIG. 13B shows an embodiment where the bottoms of the printheads of the color ink jet pens 112 are positioned near or aligned with the bottom of the printhead of the black inkjet pen 110 so as to be nearer the paper output rollers. This allows the ink from the black pen 110 to spend less time in the printing area before the paper is ejected. This is desirable since the printer area can be at a high temperature or experience other harsh conditions.

In FIG. 13C, the centers of the printheads of the color inkjet pens 112 are aligned near or at the center of the printhead of the black inkjet pen 110. This would generally cause the characteristics of the paper to be symmetrical with respect to the centers of the pens 110 and 112. This may result in print quality advantages by balancing the benefits obtained by the previous two alignments. The alignment of pens 110 and 112 may also be off from center to variable degrees to achieve the best printing results. For example, the dimension of A in FIG. 13C may be 2 or 3 times the dimension of B or vice versa.

In FIG. 13D, a high resolution black pen 110 has the same printhead size as the printheads of the lower resolution color pens 112. The edges of the printheads of pens 110 and 112 are aligned. One drawback of the embodiment of FIG. 13D is that color printheads having the same width as the printhead of the black pen 10 may not be available.

In a preferred embodiment, the high resolution nozzle array has a one-half inch swath and 300 nozzles (150×2 offset columns), and the ink drop volume for each nozzle is approximately 35 picoliters. The ink reservoir for this high resolution pen contains approximately 42 millimeters of black ink. Color ink may also be used.

In one embodiment of a tricolor pen, having a nozzle plate such as that shown in either FIGS. 14, 15, or 16, the ink drop volume for each nozzle is approximately 30 picoliters per drop. An ink reservoir for each of the three colors in the tricolor pen may contain approximately 19.1 milliliters of ink. Each color is in fluid communication with 64 nozzles in a single printhead.

In a preferred embodiment of each individual color pen 118, 119, or 120 illustrated in FIG. 17, the ink drop volume for each nozzle is approximately 104 picoliters, and the ink reservoir holds approximately 42 milliliters of ink. Each printhead contains approximately 104 nozzles at a dpi of 300.

In addition to the consideration being paid to the alignments between the color inkjet printheads and the black inkjet printhead, the alignment between the individual dots printed by the black pen 110 and the color pen or pens 112 may also be selected to provide the desired print characteristics.

FIGS. 18–22 illustrate various alignments between the high resolution dots, having diameters of about 1/600 inch, and the lower resolution dots, having diameters of about 1/300 inch. Ink bleed may cause the ink from adjacent dots to merge. The dots in FIGS. 18–22 are shown separated for clarity. The paper transport direction is assumed to be downward with respect to the page, and the pen scan direction is perpendicular to the paper transport direction.

Figure 18:
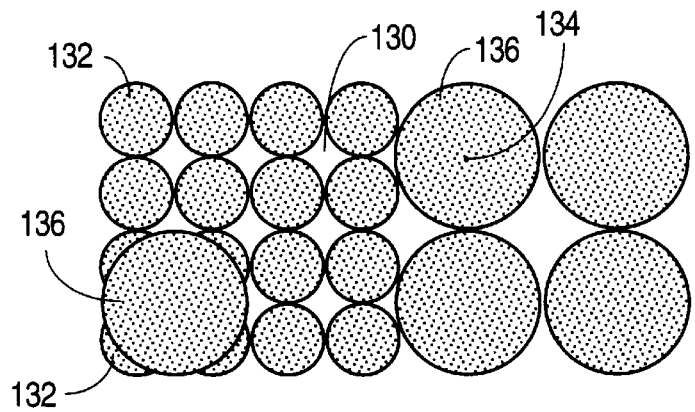
FIGS. 18–24 illustrate various possible alignments between printed high resolution dots and lower resolution dots.

In FIG. 18, the centroid 130 of a cluster of four high resolution dots 132 is aligned with the centroid 134 of a single lower resolution dot 136. One goal is to maximize the ink coverage on the page while at the same time minimizing the amount of ink put down on the page. The alignment of dots in FIG. 18 comes close to, if not achieves, this goal. In one particular application, the centroid 134 of the lower resolution dot 136 may overlap the centroid 130 of a cluster of four high resolution dots 132. Such an overlap is shown. This may be desirable for achieving particular colors or print characteristics. Also, one or more columns of the high resolution dots 132 may be printed between columns of the lower resolution dots 136. Additionally, a lower resolution dot 136 may be completely surrounded by higher resolution dots 132 as would be the case if a single lower resolution dot 136 were placed in the middle of the array of high resolution dots 132 shown in FIG. 18.

Figure 19:
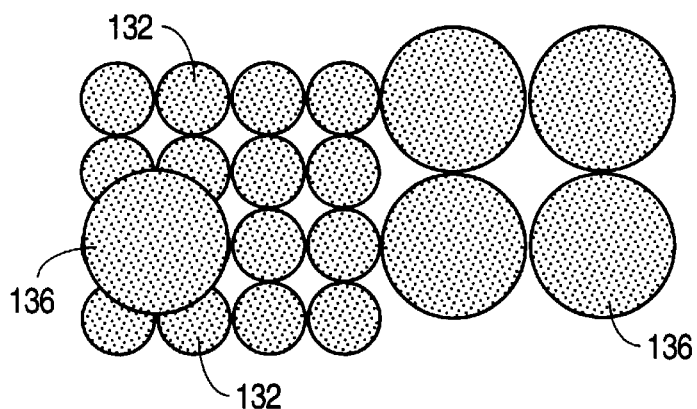

FIG. 19 illustrates another dot alignment where the lower resolution dots 136 are shifted up or down one-half of a high resolution dot 132 diameter. The overlap of a lower resolution dot 136 and four high resolution dots 132 is shown.

Figure 20:
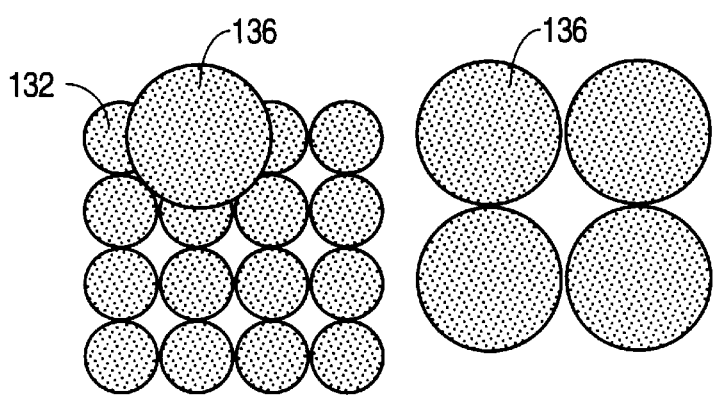

FIG. 20 illustrates another dot alignment where a centroid of a lower resolution dot 136 may be aligned with the centroid of a high resolution dot 132 or aligned between two high resolution dots 132. The lower resolution dot 136 may print directly over a high resolution dot 132 or partially over a high resolution dot 132, as illustrated.

Figure 21:
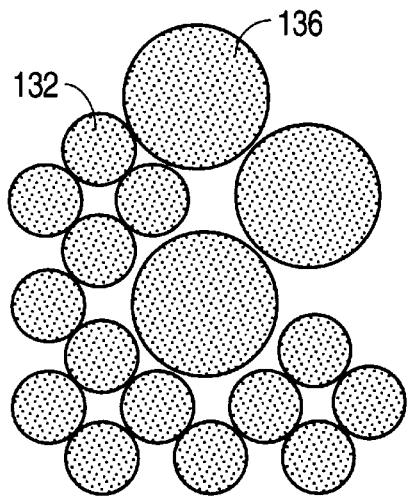

In FIGS. 18–20, four high resolution dots 132 are placed around their centroid 130 at 450 from the x and y axis lines. Four high resolution dots 132 may also be placed along the 90° axis lines, as shown in FIG. 21. Such an arrangement of high resolution dots 132 may be created by either modifying the arrangement of nozzles in the nozzle array of an inkjet pen (or tilting the pen) to produce the dot arrangement of FIG. 21 in a single swath or by modifying the energization speed of the inkjet firing resistors in combination with reducing the incremental steps of the paper. The mixed resolution dot alignments of FIG. 21 present certain advantages in graphics applications. A cluster of lower resolution dots 136 may either have the diamond pattern of FIG. 21 or the square pattern of FIGS. 18–20.

Other mixed dot resolutions are also contemplated, such as 3 to 1 resolutions or 4 to 1 resolutions, producing either a nine dot cluster or a sixteen dot cluster for every single lower resolution dot.

Figure 22:
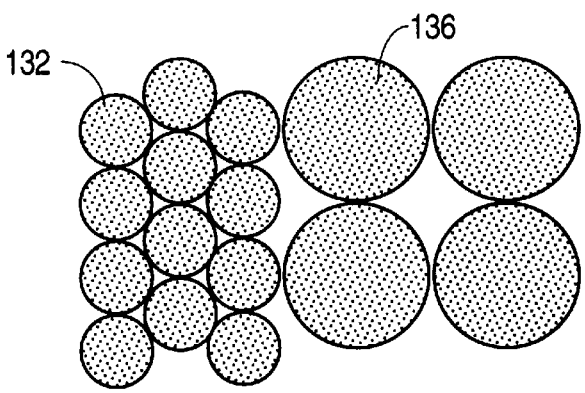
Figure 23:
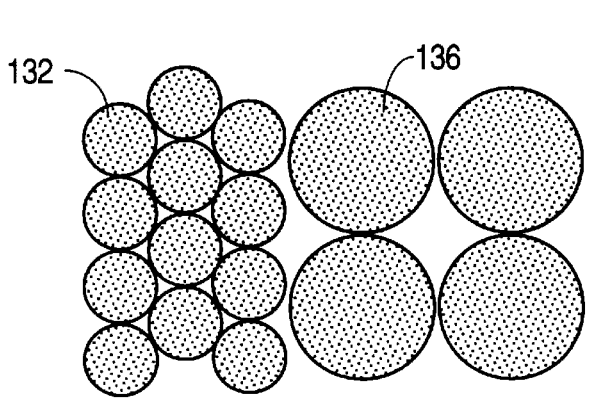
Figure 24:
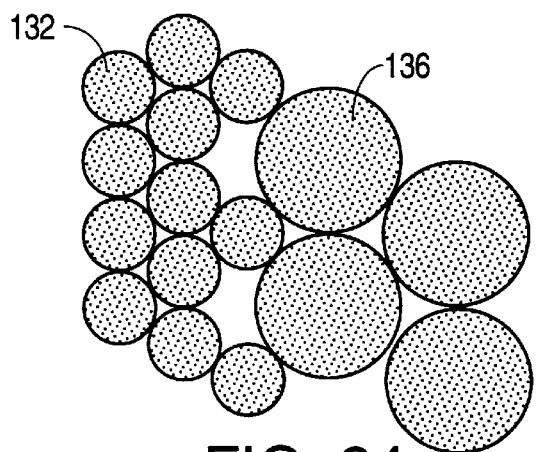

FIGS. 22–24 illustrate other alignments of high and lower resolution dots.

In FIG. 22, adjacent columns of high resolution dots 132 are staggered, and a centroid of a cluster of four high resolution dots 132 is aligned with a centroid of a lower resolution dot 136.

In FIG. 23, a similar arrangement is shown except that the lower resolution dots 136 are shifted downward by one half of a higher resolution dot 132 diameter.

In FIG. 24, variations of the high resolution dot 132 patterns and lower resolution dot 136 patterns are shown to illustrate the various combinations of alignments which may be obtained.

Any combination of high resolution and lower resolution dots may directly overlap to produce various colors or shades or more intense colors. The black, high resolution dots 132 may be printed during the same scan as the lower resolution dots 136 or during a different scan to reduce ink bleed and to otherwise enhance print quality.

The dot alignments of FIGS. 18–24, or a combination of the alignments, may be used to maximize the ink coverage on a page while minimizing the amount of ink put down. Dot alignments may even be changed during printing or between print jobs as desired. The selection of a particular arrangement may depend on the expected ink bleed and ink characteristics as well as the particular image being printed.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for printing using a mixed resolution printer comprising the steps of:

generating firing signals of a first frequency and firing signals of a second frequency;

providing said firing signals of said first frequency to a first printhead, having a first array of nozzles, to print black dots of a first size at a first print resolution along an x direction and a y direction, as said first printhead scans across a medium in said x direction, said y direction being perpendicular to said x direction, all black dots to be printed on said medium being printed by said first printhead, said first printhead being mounted in a scanning carriage; and providing said firing signals of said second frequency, less than said first frequency, to a second printhead, having a second array of nozzles, to print color dots of a second size, larger than said first size, at a second print resolution lower than said first print resolution along said x direction and said y direction, as said first printhead and said second printhead scan across said medium in said x direction, said second printhead being mounted in said scanning carriage along with said first printhead, nozzles within said second array of nozzles having less nozzles per inch in said y direction than nozzles per inch in said y direction in said first array of nozzles, said color dots having a certain color selected from the group consisting of cyan, magenta, and yellow, all of said certain color to be printed on said medium being printed by said second printhead, wherein said firing signals of said first frequency and said firing signals of said second frequency, in conjunction with said nozzles per inch in said y direction in said first array of nozzles and said second array of nozzles, printing a higher dots per inch density of said dots of said first size in said x direction and said y direction as compared to a dots per inch density of said dots of said second size in said x direction and said y direction on said medium, said first array of nozzles and said second array of nozzles being, aligned with respect to one another within said scanning carriage, and said first printhead and said second printhead printing said dots of said first size and said dots of said second size in response to said firing signals provided to said first printhead and said second printhead, so that said dots of said first size and said dots of said second size are aligned with each other on said medium along said x direction and said y direction.

2. The method of claim 1 wherein said nozzles in said first array of nozzles and said nozzles in said second array of nozzles are arranged, and said firing signals received by said first printhead are timed relative to said firing signals received by said second printhead, so that said dots of said first size and said dots of said second size are aligned when printed on said medium such that centroids of said dots of said first size in a line of dots along said x direction are aligned with centroids of said dots of said second size in said x direction.

3. The method of claim 2 wherein dots in a cluster of four dots of said first size are positioned about a centroid of said cluster at 45 angles with respect to said x direction and y direction.

4. The method of claim 2 wherein dots in a cluster of four dots of said first size are positioned about a centroid of said cluster at 90° angles with respect to said x direction and said y direction.

5. The method of claim 1 wherein said nozzles in said first array of nozzles and said nozzles in said second array of nozzles are arranged, and said firing signals received by said first printhead are timed relative to said firing signals received by said second printhead, so that said dots of said first size and said dots of said second size are aligned when printed on said medium such that a midpoint between two vertically aligned dots of said first size is aligned with a centroid of said dot of said second size along said x direction.

6. The method of claim 5 wherein dots in a cluster of four dots of said first size are positioned about a centroid of said cluster at 45° angles with respect to said x direction and said y direction.

7. The method of claim 5 wherein dots in a cluster of four dots of said first size are positioned about a centroid of said cluster at 90° angles with respect to said x direction and said y direction.

8. The method of claim 1 wherein said second printhead prints ink including a color component selected from a group consisting of cyan, magenta, and yellow.

9. The method of claim 1 wherein said second printhead prints a plurality of ink colors.

* * * * *